LOGIC CIRCUIT EMPLOYING MAGNETIC CORES
Filed April 27, 1954
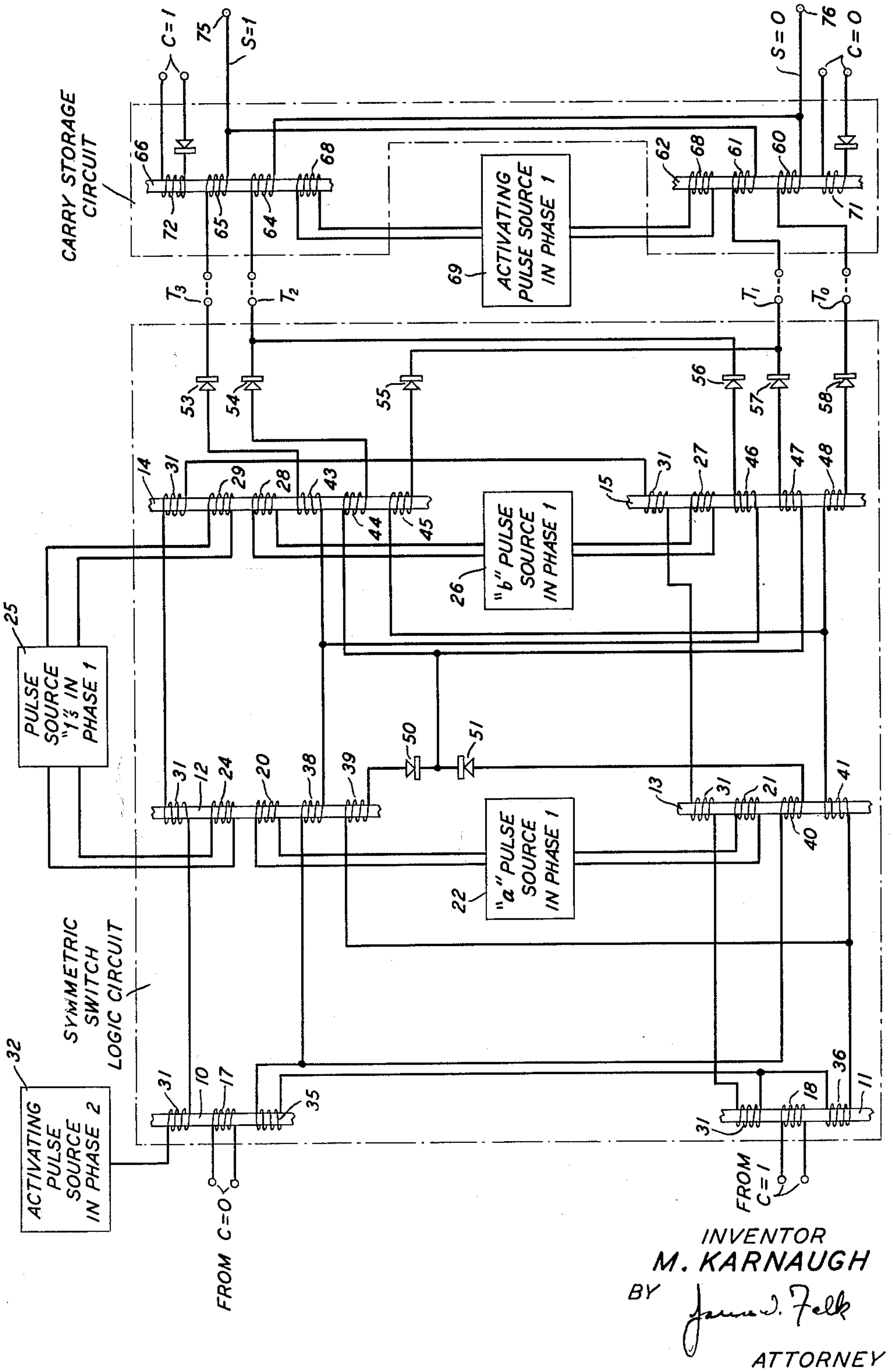
INVENTOR
M. KARNAUGH
BY James J. Falk
ATTORNEY

United States Patent Office 3,094,611
Patented June 18, 1963

3,094,611

LOGIC CIRCUIT EMPLOYING MAGNETIC CORES

Maurice Karnaugh, New Providence, N.J., assignor to Bell Telephone Laboratories, Incorporated, New York, N.Y., a corporation of New York Filed Apr. 27, 1954, Ser. No. 425,347
12 Claims. (Cl. 235—175)

This invention relates to electrical circuits and more particularly to such circuits employing magnetic cores.

Magnetic core circuits generally comprise a plurality of windings on a core of a magnetic material having a substantially rectangular hysteresis loop. Such materials are known in the art and may include certain ferrites, such as the General Ceramics $S_1$, $S_2$, $S_3$ Ferramic materials, Deltamax, a grain oriented 50 percent nickel iron alloy of the Allegheny Ludlum Steel Company, 4–79 molybdenum permalloy, supermalloy, and other materials.

The core is initially in one state of maximum remanent magnetization called the normal, or reset state. The input windings and the pulses applied thereto are such that the core either remains in its normal state or is switched to the opposite state of maximum remanent magnetization, called the set state, depending on the values of the input variables. An activating pulse is then applied to an activating winding and causes the core to be reset, i.e., to switch back to the normal state if the core has priorly been set. An output indication can then be obtained due to the large change of flux in a priorly set core, which induces an output E.M.F. in an output winding.

It is a general object of this invention to provide improved electrical circuits employing magnetic core elements.

It is an object of this invention to provide an improved circuit employing magnetic cores wherein an output appears at one of a given number of terminals dependent on the number of the input variables that are active, or equal to "1," regardless of the specific input variables that are active. Following usual conventions we shall consider a variable to be equal to "1" if active or present and equal to "0" if inactive or not present. Further, we define a setting function, *s*, of the input variables to have the value "1" when the core is set by its input pulses and to have the value "0" when the core remains reset.

It is a further object of this invention to provide an improved binary adder circuit employing magnetic core elements.

It is another object of this invention to provide an improved sequential circuit comprising magnetic cores and having internal logic and storage functions.

These and other objects are attained in one specific embodiment of the invention wherein a binary adder comprises a symmetric switch logic circuit and a carry storage circuit. The symmetric switch circuit comprises three stages of pairs of magnetic cores. The setting function of one core of each pair is an input variable and the setting function of the other core of each pair is the negation of the input variable. The activating windings of the cores of the symmetric switch circuit are all connected in series and to a branching array of output windings. The output windings are wound on each core so that a blocking electromotive force is induced thereacross on application of the activating pulse if the core has been priorly set. There is accordingly only one possible path through the branching array of output windings for the output pulse to follow.

Output windings are provided so that each output winding of one stage is connected to an output winding on both cores of the succeeding stage, but an output winding of the next stage may be shared by output windings on different cores of the preceding stage, thereby preventing the number of output windings from becoming excessively large.

The symmetric switch has one more output terminal than the number of input variables applied to the stages of the circuit. Thus if there are $n$ input variables and $n$ stages of the circuit, there are $n+1$ output terminals, each terminal corresponding to a number of inputs, from 0 to $n$, inclusive, that are active irrespective of the particular ones of the inputs that may be active.

In this specific embodiment comprising a binary adder the input variable applied to the first stage of the symmetric switch logic circuit is the carry function obtained from a pair of magnetic cores of a carry storage circuit. One or the other of the carry storage cores is set by the output appearing at the output terminals of the symmetric switch logic circuit. The activating pulses are applied to the logic and storage cores in alternate phases.

It is a feature of this invention that an electrical circuit comprise pairs of magnetic cores in stages, one core of each stage being set by a pulse corresponding to the value "1" of an input variable and the other by the presence of a pulse corresponding to the value "0" of that variable. The output windings on any core of one stage are connected to one output winding on both cores of the succeeding stage to define a plurality of possible branching paths through the array of output windings.

It is a feature of this invention that for any possible combination of input variable values only one path through this branching array is available to the output pulse.

It is another feature of this invention that output terminals be provided to which the output windings of the pair of cores of the last stage are connected, an output appearing at any terminal being indicative of the number of active input variables irrespective of the particular input variables that are active.

It is a further feature of this invention that a binary adder comprise a symmetric switching or logic circuit and a pair of carry storage magnetic cores, the input windings of the storage cores being connected to the terminals of the symmetric logic circuit and the output windings of the storage cores being connected to the input windings of the first stage of the logic circuit.

A complete understanding of this invention and of these and other desirable features thereof may be gained from consideration of the following detailed description and the accompanying drawing, the sole FIGURE of which is a schematic representation of a binary adder illustrative of one specific embodiment of the invention.

The binary adder depicted in the drawing includes one embodiment of a symmetric pulse switch or logic circuit having a number of stages of pairs of magnetic cores so that if there are $n$ input variables, there are $n+1$ output terminals. Each output terminal, in accordance with this invention, corresponds to a particular number of the input variables, from 0 to $n$, inclusive being active or present regardless of which specific inputs are actually active or present. Thus the output of the symmetric switch circuit is an indication merely of the number of inputs present. In this specific embodiment, the output terminals of the symmetric switch are connected to the input windings of a pair of carry storage magnetic cores whose output windings are connected to provide the input variables of the first stage of the symmetric switch.

In this embodiment the symmetric switch comprises three stages including a first pair of magnetic cores 10, 11, a second pair of magnetic cores 12, 13, and a third pair of magnetic cores 14, 15. These cores are provided with input windings so that at each stage the binary value "1" of an input variable has the effect of setting one core of the stage and the binary value "0" of that variable has the effect of setting the other core. The input variable $c$ is applied to the first stage, an input or set pulse being applied to the set winding 17 of core 10 when $c=0$ and an input pulse being applied to the set winding 18 of core 11 when $c=1$; as we are presently considering mainly the symmetric switch itself we shall not be concerned at this time with how the $c$ input variables are obtained.

The input variable $a$ is applied to the second stage, a pulse being applied to the input windings 20 and 21 of cores 12 and 13, respectively, from an "$a$" pulse source 22 whenever $a=1$, the pulse applied to winding 21 setting that core. However, a set pulse from a pulse source 25 is always applied to a set winding 24 on core 12 at each time that input information is applied to the second stage cores, the winding 24 and this set pulse being such as to tend to set the core while the pulse through the input winding 20 tends to magnetize the core so that it is reset. Accordingly, core 12 is set only when $a=0$, in which case no input pulse is applied to winding 20, and core 13 is set only when $a=1$.

Similarly, the input variable $b$ is applied to the third stage, a pulse being applied from a "$b$" pulse source 26 to a set winding 27 on core 15 and to a reset winding 28 on core 14, a set pulse also being applied to a winding 29 from source 25 so that core 14 is set when $b=0$ and core 15 when $b=1$.

An activating winding 31 is wound on each of cores 10 through 15, the activating windings being connected in series and to an activating pulse source 32. A branching array of output windings, described in detail below, is connected to the last of the series connected activating windings, the activating pulse passing through one of the possible paths of this array to an output lead depending on the prior condition of the cores. In the specific embodiment of this invention all but one of the possible paths will be blocked due to a back electromotive force being induced across at least one output winding in each blocked path by the reversal of the magnetization in the cores; reference is made to my application Serial No. 393,399, filed November 20, 1953, now Patent No. 2,719,773, issued October 4, 1955, for a further discussion of pulse switching circuits employing series connected activating windings and parallel possible output paths all but one of which is blocked by a back electromotive force across an output winding thereof on application of the activating pulse to the activating windings.

The output windings which define these possible paths of the branching array comprise one winding on each of the first stage cores, two windings on each of the second stage cores, and, in this embodiment, three windings on each of the third stage cores. Each output winding on a given core is connected to an output winding on each of the two cores of the next stage. However, by connecting more than one output winding of a prior stage to the output windings of a succeeding stage the number of output windings is reduced and does not increase geometrically for each succeeding stage in the circuit.

In this specific embodiment the output windings include winding 35 on core 10, winding 36 on core 11, windings 38 and 39 on core 12, windings 40 and 41 on core 13, windings 43, 44, and 45 on core 14, and windings 46, 47, and 48 on core 15. Winding 39 on core 12 and winding 40 on core 13 are both connected to the same output windings 44 and 47 of the next stage to reduce the required number of output windings, as mentioned above. Diodes 50 and 51 are connected to the output windings 39 and 40 to assure that there are oppositely poled diodes in every possible closed loop in the array of output windings. This is to prevent undesirable circulation of current while the cores are being set or reset. When the activating pulse is applied either core 12 or 13 is being reset and accordingly either output winding 39 or 40 will have electromotive force induced thereacross.

If core 13 were being reset the voltage induced across winding 40 would be of a polarity to prevent current from a first stage winding going through it but would be of a polarity to aid the reverse flow of current through it from the other second stage winding 39; accordingly, without diode 51 this current might flow. Further when core 12 is being set by a pulse applied to input winding 24 and no pulse applied to input winding 20, a forward electromotive force is induced across winding 39 which, in the absence of diode 51, would cause current to flow in the closed loop including the winding 40, which has no voltage induced thereacross, the winding 35 of core 10, and the winding 36 of core 11, assuming that core 11 were being set so that a voltage were being induced thereacross to aid the flow of current in this closed loop. A similar argument, in which the roles of cores 12 and 13 are interchanged, can be used to demonstrate that diode 50 also is useful in preventing undesirable circulating currents.

Diodes 53, 54, 55, 56, 57, and 58 are similarly connected to the third stage output windings 43, 44, 45, 46, 47, and 48 to assure that there are no such sneak paths or closed loops through a low impedance load.

A pulse through either winding 44 or 46 of the third stage cores indicates that two input variables are active and accordingly these two windings may be connected to a single output terminal $T_2$; similarly, the windings 45 and 47 are connected to the single output terminal $T_1$. Winding 43 is connected to terminal $T_3$ and winding 48 to terminal $T_0$. An output pulse at a particular terminal thus indicates the number of input variables of the symmetric switch which are active, but not which particular variables are active.

The possible paths through the branching array of output windings for various combinations of input variable values are summarized in the following table:

| Inputs | | | Magnetic Condition of the Cores | | | | | | Sole Output Path Not Blocked (Windings) | Output at Terminal |
|---|---|---|---|---|---|---|---|---|---|---|
| $c$ | $a$ | $b$ | 10—11 | | 12—13 | | 14—15 | | | |
| 0 | 0 | 0 | set | --- | set | --- | set | --- | 36—41—48 | $T_0$ |
| 0 | 0 | 1 | set | --- | set | --- | --- | set | 36—41—45 | $T_1$ |
| 0 | 1 | 0 | set | --- | --- | set | set | --- | 36—39—47 | $T_1$ |
| 0 | 1 | 1 | set | --- | --- | set | --- | set | 36—39—44 | $T_2$ |
| 1 | 0 | 0 | --- | set | set | --- | set | --- | 35—40—47 | $T_1$ |
| 1 | 0 | 1 | --- | set | set | --- | --- | set | 35—40—44 | $T_2$ |
| 1 | 1 | 0 | --- | set | --- | set | set | --- | 35—38—46 | $T_2$ |
| 1 | 1 | 1 | --- | set | --- | set | --- | set | 35—38—43 | $T_3$ |

Accordingly, we have shown how a single path is available through the branching array of output windings of the symmetric switch circuit dependent on which cores have been set and therefore on the values of the input variables $c$, $a$, and $b$. Further we have shown how the appearance of an output pulse at a particular output terminal $T_i$ indicates that a number $i$ of input variables are active, i.e., equal to "1," regardless of the particular ones of the input variables that were active. In accordance with another aspect of this invention this symmetric switch circuit is incorporated into a serial binary adder by connecting input windings 60 and 61 of a carry storage core 62 to terminals $T_0$ and $T_1$, respectively, and input windings 64 and 65 of a carry storage core 66 to terminals $T_2$ and $T_3$, respectively.

Each of the cores 62 and 66 includes an activating winding 68 connected to an activating pulse source 69. An output winding 71 is wound on core 62 and an output winding 72 on core 66.

In a binary adder embodying features of this invention if the output of the symmetric switch occurs at terminal $T_0$ or $T_1$, the carry for the next operation is "0"; if the output occurs at terminal $T_2$ or $T_3$, the carry for the next operation is "1." Accordingly, an output appearing at either $T_0$ or $T_1$ will set score 62 so that, on application of the activating pulse to winding 68, an output appears at the winding 71 representing $c=0$; output winding 71 of core 62 is accordingly advantageously connected to the input winding 17 of core 10. Similarly, an output at winding 72 represents $c=1$, and this winding is advantageously connected to the input winding 18 of core 11.

In a binary adder of this type also the sum S is "0" if the output of the symmetric switch is zero or two and "1" if the output of the symmetric switch is one or three. Therefore, an output terminal 75 connected to the windings 61 and 65 receives an output pulse from either terminal $T_1$ or $T_3$, and indicates $S=1$; similarly, an output terminal 76 connected to the windings 60 and 64 receives an output pulse from either terminal $T_0$ or $T_2$ and indicates $S=0$.

Two phase operation is advantageously employed for the binary adder depicted in the drawing; the two phases may be alternate phases of a synchronous clock source, as is known in the art. In phase 1 the input variables *a*, *b*, and *c* are applied to the symmetric switch portion of the circuit and an activating pulse is applied to the activating windings of the storage portion of the circuit; in phase 2 the activating pulse is applied to the activating windings of the symmetric switch and the output from the circuit attained, the output setting the storage portion of the circuit, as described above. Therefore pulse sources 22, 25, 26, and 69 are active in phase 1 and pulse source 32 in phase 2, as indicated on the drawing.

The binary adder depicted in the drawing may also be considered a general sequential circuit in which the symmetric switch circuit comprising the stages of pairs of magnetic cores, is the general logic circuit, and the carry storage circuit, comprising the carry storage magnetic cores, is the internal variable storage. In the sequential circuit, accordingly, the logic and storage circuit portions both comprise magnetic core circuits, there is a feedback from the output windings of the storage cores to the input windings of the logic cores, and the activating pulses are applied to the activating windings of the logic and storage cores in alternate phases.

It is to be understood that the above-described arrangements are illustrative of the application of the principles of the invention. Numerous other arrangements may be devised by those skilled in the art without departing from the spirit and scope of the invention.

What is claimed is:

1. A binary adder comprising pairs of logic magnetic cores, each of said cores having input, activating, and output windings thereon, means connecting said activating windings in series, means for applying an activating pulse to said activating windings, means for applying input pulses to said input windings to set one of each of said pairs of logic cores, means connecting said output windings to said series connected activating windings so that said activating pulse flows through an output winding on one of each pair of logic cores in succession dependent on the input pulses applied to said input windings, a pair of carry storage magnetic cores each having input, activating, and output windings thereon, means for applying a pulse to said storage core activating windings out of phase with said first mentioned activating pulse, means connecting said storage input windings to the output windings of a given one of said pairs of logic cores, and means connecting said storage output windings to the input windings of another of said pairs of logic cores.

2. An electrical circuit comprising a plurality of stages each including a pair of magnetic cores having input, activating, and output windings thereon, means for applying a pulse to an input winding of one of each of said cores to set said one core of each pair dependent on the value of the input variable associated with that stage of the circuit, means connecting said output windings in a branching array, each output winding on one core being separately serially connected to an output winding on each core of the next succeeding stage, and means including said activating windings for resetting said cores and applying an output pulse to said branching array of output windings, whereby there is only one possible path through said array for said output pulse for each combination of values of the input variables of the various stages of the circuit.

3. An electrical circuit having $n+1$ output terminals each corresponding to the occurrence of from 0 to $n$ input pulses each representing a particular value of the corresponding input variable but not to the occurrence of any particular ones of said input variables, comprising $n$ pairs of magnetic cores arranged in succession, each of said cores having an input winding, an activating winding, and an output winding, means including said input windings for setting one of said cores of each pair dependent on the value of the input variable associated with that pair of cores, means connecting said output windings in a branching array, there being one output winding on each of the first pair of cores and each output winding on any core being separately serially connected to an output winding on each of the next pair of cores, means including said activating windings for resetting said cores and applying an output pulse to said branching array of output windings, and means connecting said output terminals to the output windings of the last pair of cores.

4. An electrical circuit having $n+1$ output leads each corresponding to the occurrence of from 0 to $n$ input pulses each representing a particular value of the corresponding input variable comprising $n$ pairs of magnetic cores arranged in successive stages, each of said cores having an input winding, an activating winding, and an output winding, means including said input windings for applying a set pulse corresponding to a distinct variable to one of each of said pairs of cores and for applying a set pulse corresponding to the negation of said distinct variable to the other of said pairs of cores, means connecting said activating windings in series, means for applying an activating pulse to said series connected activating windings, and means connecting said output windings to said activating windings in a branching array, each output winding on any core being separately serially connected to an output winding on each of the cores of the next stage, said output terminals being connected to the output windings of the cores of the last stage.

5. An electrical circuit comprising a logic circuit including a plurality of magnetic cores each having an input, activating, and output winding, input leads connected to said input windings and output leads connected to certain of said output windings, the state of said output leads at any given time being determined by the state of said input leads at a prior time, means connecting the activating windings of the cores of said logic circuit in series to each output winding of each core also of said logic circuit, a storage circuit comprising a plurality of magnetic cores each having an input, activating, and output winding, means connecting certain of said output leads to said storage circuit input windings, means connecting said storage core output windings to certain of said input leads, and means for applying activating pulses to said logic and storage magnetic core activating windings in alternate phases.

6. A binary adder comprising a plurality of logic magnetic cores, a pair of carry storage magnetic cores, each of said cores including an input, an activating, and an output winding, means connecting said logic core activating windings to each of said logic core output windings in series, means connecting certain of said logic core output windings to said carry storage core input windings, means connecting said carry storage core output windings to certain of said logic core input windings, and means for applying activating pulses to said logic core and said carry storage core activating windings in alternate phases.

7. A binary adder comprising a plurality of digit input logic magnetic cores, a pair of carry storage magnetic cores and a pair of carry input logic magnetic cores, each of said cores having input, activating, and output windings, means connecting the activating windings of said carry input logic magnetic cores in series to each of the output windings also of said carry input logic magnetic cores, means connecting certain of said digit and carry input logic core output windings to said carry storage core input windings, means connecting said carry storage core output windings to said carry input logic core input windings, and means for applying activating pulses to said logic and said carry storage core activating windings in alternate phases.

8. A binary adder in accordance with claim 7 wherein said plurality of digit input logic magnetic cores includes a plurality of pairs of cores, said carry input and digit input logic core output windings being connected in a branching array, each output winding on any core separately of said logic cores being serially connected to an output winding on each of the logic cores of the next pair.

9. A binary adder in accordance with claim 8 wherein said digit input logic core activating windings are connected in series with said carry input logic core activating windings and to said branching array of logic core output windings.

10. A binary adder comprising a pair of carry input logic magnetic cores and pairs of digit input logic magnetic cores, each of said cores having input, activating, and output windings thereon, means connecting said activating windings in series, means for applying an activating pulse to said series connected activating windings, means including said input windings for setting one of each pair of said logic magnetic cores dependent on the values of the input variables, means connecting said output windings to said series connected activating windings so that said activating pulse flows through an output winding on one of each pair of logic cores dependent on the values of said input variables, a pair of carry storage magnetic cores, said storage cores each having input, activating and output windings thereon, means for applying a pulse to said storage activating windings out of phase with said priorly mentioned activating pulse, means connecting the output windings of a given one of said pairs of digit input logic magnetic cores to said storage input windings, and means connecting said storage output windings to the input windings of said carry input logic cores.

11. A device for adding binary numbers comprising a plurality of groups of cores with two cores in each group, input means for and complementary to each group of cores, each input means having two outputs respectively representing binary "0" and binary "1" and including means for applying a magnetizing force to one core of its complementary group when producing a binary "0" output and for applying a magnetizing force to the other core of its complementary group when producing a binary "1" output, means connected to each input means for causing the latter to produce one or the other of its two outputs, sum output means inductively coupled to said cores for producing a sum output signal, and carry output means inductively coupled to said cores for producing a carry output signal.

12. A device for adding binary numbers comprising three groups of cores with two cores in each group, there being two groups of cores respectively for two binary numbers to be added and a third group for the carry input signal, input means for and complementary to each group of cores, said cores having substantially rectangular hysteresis loops, each input means having two outputs respectively representing binary "0" and binary "1" and including means for applying a magnetizing force to one core of its complementary group when producing a binary "0" output and for applying a magnetizing force to the other core of its complementary group when producing a binary "1" output, said magnetizing forces resetting the cores, means connected to each input means for causing the latter to produce one or the other of its two outputs, sum output means inductively coupled to said cores for sensing said cores and producing a sum output signal when appropriate, said sum output means also including means for setting those cores which were previously reset by the input means, and carry output means inductively coupled to said cores for sensing said cores and producing a carry output signal when appropriate and for setting those cores which were previously reset by the input means.

References Cited in the file of this patent

UNITED STATES PATENTS

| | | |
|---|---|---|
| 2,680,819 | Booth | June 8, 1954 |
| 2,696,347 | Lo | Dec. 7, 1954 |
| 2,697,178 | Isborn | Dec. 14, 1954 |

OTHER REFERENCES

Magnetic Cores as Elements of Digital Computing Systems by Haynes, 1950, pp. 50–56, 64–68.